United States Patent
Wan

(10) Patent No.: US 9,279,577 B2
(45) Date of Patent: Mar. 8, 2016

(54) LED LIGHTING DEVICE AND METHOD FOR MAKING THE SAME

(71) Applicant: ZHEJIANG SHENGHUI LIGHTING CO., LTD, Jiaxi (CN)

(72) Inventor: Yehua Wan, Jiaxing (CN)

(73) Assignee: ZHEJIANG SHENGHUI LIGHTING CO., LTD., Jiaxing (CN)

( * ) Notice: Subject to any disclaimer, the term of this patent is extended or adjusted under 35 U.S.C. 154(b) by 60 days.

(21) Appl. No.: 14/251,095

(22) Filed: Apr. 11, 2014

(65) Prior Publication Data

US 2014/0226334 A1  Aug. 14, 2014

Related U.S. Application Data

(63) Continuation-in-part of application No. PCT/CN2012/077025, filed on Jun. 15, 2012.

(30) Foreign Application Priority Data

Apr. 22, 2011  (CN) .......................... 2011 1 0101644

(51) Int. Cl.
| | | |
|---|---|---|
| *F21V 29/00* | (2015.01) | |
| *F21V 15/01* | (2006.01) | |
| *F21V 23/00* | (2015.01) | |
| *H05B 33/08* | (2006.01) | |
| *F21K 99/00* | (2010.01) | |
| *F21V 29/507* | (2015.01) | |
| *F21V 29/77* | (2015.01) | |
| *F21Y 101/02* | (2006.01) | |
| *F21Y 105/00* | (2006.01) | |

(Continued)

(52) U.S. Cl.
CPC ................. *F21V 29/22* (2013.01); *F21K 9/135* (2013.01); *F21K 9/1355* (2013.01); *F21K 9/90* (2013.01); *F21V 15/01* (2013.01); *F21V 23/002* (2013.01); *F21V 23/006* (2013.01); *F21V 29/507* (2015.01); *F21V 29/773* (2015.01); *H05B 33/0803* (2013.01); *F21V 3/00* (2013.01); *F21V 19/0055* (2013.01); *F21V 29/89* (2015.01); *F21Y 2101/02* (2013.01); *F21Y 2105/001* (2013.01); *Y02B 20/341* (2013.01); *Y10T 29/302* (2015.01); *Y10T 29/4913* (2015.01)

(58) Field of Classification Search
CPC ......... F21K 9/135; F21K 9/1355; F21K 9/90; H05B 33/0803; Y02B 20/30; Y02B 20/34; Y02B 20/341; F21V 29/713; F21V 29/80
USPC .............................................. 362/249.02, 800
See application file for complete search history.

(56) References Cited

U.S. PATENT DOCUMENTS

| | | | | |
|---|---|---|---|---|
| 5,857,767 A | * | 1/1999 | Hochstein | ....................... 362/294 |
| 6,536,913 B1 | * | 3/2003 | Yajima et al. | ................. 362/231 |

(Continued)

*Primary Examiner* — Alan Cariaso
*Assistant Examiner* — Colin Cattanach
(74) *Attorney, Agent, or Firm* — Anova Law Group, PLLC

(57) ABSTRACT

An LED lighting device and a method for making the LED lighting device, the LED lighting device having a PCB positioned over a cooling substrate on the top of a metallic heat-dissipation lamp cup. LED light sources are provided on the PCB and are connected to a power supply. Screws are used to attach the PCB to the cooling substrate. At least one screw includes a screw head electrically connected to one of the positive electrode and the negative electrode, and a screw body electrically connected to the metallic heat-dissipation lamp cup, such that the at least one screw provides a bypass discharge path between the LED light sources and the metallic heat-dissipation lamp cup to release leakage current and to protect the LED light sources.

16 Claims, 4 Drawing Sheets

(51) Int. Cl.
  *F21V 3/00* (2015.01)
  *F21V 19/00* (2006.01)
  *F21V 29/89* (2015.01)

(56) References Cited

U.S. PATENT DOCUMENTS 8,604,607 B2 * 12/2013 Mori .............................. 257/706
2003/0189829 A1 * 10/2003 Shimizu et al. ............... 362/240
2005/0024834 A1 * 2/2005 Newby .......................... 361/719
2008/0123016 A1 * 5/2008 Kwak et al. ..................... 349/59
2008/0310167 A1 * 12/2008 Zaderej et al. ................. 362/294
2010/0053962 A1 * 3/2010 Mo et al. ................... 362/249.01
2010/0096992 A1 * 4/2010 Yamamoto et al. ........... 315/112
2011/0182067 A1 * 7/2011 Watanabe ..................... 362/235
2012/0223632 A1 * 9/2012 Hussell et al. ................. 313/483
2012/0293985 A1 * 11/2012 Nozawa ........................ 362/97.1

* cited by examiner

LED LIGHTING DEVICE AND METHOD FOR MAKING THE SAME

CROSS-REFERENCES TO RELATED APPLICATIONS

This application is a continuation in part of a PCT Patent Application PCT/CN2012/077025, filed on Jun. 15, 2012, which claims the priority of Chinese Patent Application No. 201110101644.6, filed on Apr. 22, 2011, the entire contents of all of which are incorporated herein by reference.

FIELD OF THE DISCLOSURE

The present disclosure relates to the field of light emitting diode (LED) technology and, more particularly, relates to an LED lighting device, including anti-breakdown LED light sources, and a method for making the LED lighting device, including an anti-breakdown protection method for the LED light sources.

BACKGROUND

LED lighting devices are often tested under high voltages before leaving the factory. Such high-voltage testing is designed to detect voltage-resistant capabilities of the LED lighting devices under extreme conditions and to detect whether an electric shock would occur when touched by a human body.

Conventional testing methods include wrapping a metal heat-dissipation lamp cup and a lamp head with a layer of metal foil and then using electrical clamps to clamp two pieces of metal foil. A high voltage of about 1500V to 4000V can be applied to the two pieces of metal foil to detect eligibility of the LED lighting device.

However, LED light sources (often made by a chip) of LED lighting devices may be broken down to cause damages and big losses during such high-voltage testing. This may be because that a circuit for a small amount of leakage current can be formed between the lamp head, a power supply, and the LED light sources during the high-voltage testing. When this small amount of leakage current exceeds a tolerance limit of the LED light sources, these LED light sources may be broken down.

BRIEF SUMMARY OF THE DISCLOSURE

One aspect or embodiment of the present disclosure includes a method for making an LED lighting device. A power supply can be provided within a plastic base. A metallic heat-dissipation lamp cup can be provided to cover the plastic base. A cooling substrate can be provided on the metallic heat-dissipation lamp cup. A printed circuit board (PCB) board can be configured over the cooling substrate. One or more LED light sources can be configured on the PCB board and can include a positive electrode and a negative electrode that are provided on the PCB board and are connected to the power supply. A plurality of screws can be used to attach the PCB board to the cooling substrate on the metallic heat-dissipation lamp cup. At least one screw of the plurality of screws can include a screw head electrically connected to one of the positive electrode and the negative electrode, and a screw body electrically connected to the metallic heat-dissipation lamp cup, such that the at least one screw provides a bypass discharge path between the one or more LED light sources and the metallic heat-dissipation lamp cup to release leakage current and to protect the one or more LED light sources.

Another aspect or embodiment of the present disclosure includes an LED lighting device. The LED lighting device can include a plastic base, a power supply, a metallic heat-dissipation lamp cup, a cooling substrate, a printed circuit board (PCB) board, one or more LED light sources, and a plurality of screws. The power supply can be configured within the plastic base. The metallic heat-dissipation lamp cup can be configured to cover the plastic base. The cooling substrate can be configured on the metallic heat-dissipation lamp cup. The PCB board can be configured over the cooling substrate. The LED light sources can be configured on the PCB board and can have a positive electrode and a negative electrode that are on the PCB board and are connected to the power supply. The screws can be configured to attach the PCB board to the cooling substrate on the metallic heat-dissipation lamp cup. At least one screw can include a screw head electrically connected to one of the positive electrode and the negative electrode, and a screw body electrically connected to the metallic heat-dissipation lamp cup, such that the at least one screw provides a bypass discharge path between the one or more LED light sources and the metallic heat-dissipation lamp cup to release leakage current and to protect the one or more LED light sources.

Other aspects or embodiments of the present disclosure can be understood by those skilled in the art in light of the description, the claims, and the drawings of the present disclosure.

BRIEF DESCRIPTION OF THE DRAWINGS

The following drawings are merely examples for illustrative purposes according to various disclosed embodiments and are not intended to limit the scope of the present disclosure.

DETAILED DESCRIPTION

Figure 1:
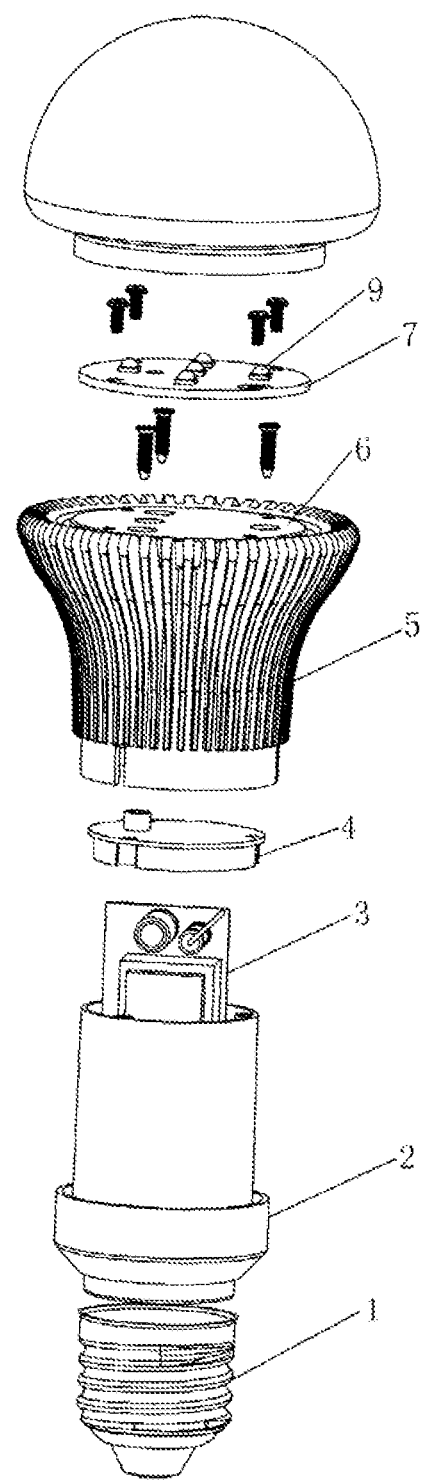
FIG. 1 depicts an exemplary LED lighting device consistent with various disclosed embodiments.

Reference will now be made in detail to exemplary embodiments of the disclosure, which are illustrated in the accompanying drawings. Wherever possible, the same reference numbers will be used throughout the drawings to refer to the same or like parts.

Disclosed herein include an LED lighting device and a method for making the LED lighting device. An exemplary LED lighting device can include anti-breakdown LED light source(s). An exemplary method for making the LED lighting device can include an anti-breakdown protection method for the LED light source(s).

The exemplary LED lighting device can include one or more LED light sources and/or a lamp cup, which may act as a heat sink. The lamp cup can be, for example, a metallic heat-dissipation lamp cup. As disclosed, the LED light source(s) can have one electrode connected to the metallic heat-dissipation lamp cup to provide a bypass discharge path to release leakage current (e.g., that conventionally formed between lamp head, power supply, and LED light sources) and thus to protect the LED light source(s). For example, one of a positive electrode and a negative electrode of the LED light source(s) can be connected to the metallic heat-dissipation lamp cup to form the bypass discharge path.

In an exemplary embodiment, the LED light source(s) can be soldered on, or otherwise connected with, a printed circuit board (PCB) board. The PCB board can be connected to the metallic heat-dissipation lamp cup via a number of screws. For example, the electrode of the LED light source(s) on the PCB board can be connected to a screw head of one screw of the number of screws, while a screw body of the one screw can be connected to the metallic heat-dissipation lamp cup.

In a certain embodiment, an LED lighting device can include a lamp head, a plastic base, a power supply configured within the plastic base, a metallic heat-dissipation lamp cup configured to cover and/or cap the plastic base, a cooling substrate configured on the metallic heat-dissipation lamp cup, a PCB board configured on the cooling substrate, one or more LED light sources configured (e.g., soldered) on the PCB board, and/or screws configured to attach the PCB board with the cooling substrate.

The power supply can be connected with electrodes of the LED light sources on the PCB board via wiring. One of the screws can include a screw head connected to one electrode of the PCB board, and a screw body connected to the metallic heat-dissipation lamp cup.

Note that screw(s) are primarily described as an example in the present disclosure, while any suitable conductive elements, e.g., conductive plug(s), conductive rod(s), etc. can be used in the disclosed LED lighting device, e.g., to replace the screw(s), to provide desired electrical and/or mechanical functions without limitation.

As such, one of the electrodes of the LED light sources can be electrically connected to the metallic heat-dissipation lamp cup in a manner to form a bypass discharge path to release leakage current to protect the LED light sources and thus to prevent breakdown of the LED light sources. In this case, not only the LED lighting device can be effectively tested under high voltages, but also the LED light sources can be protected.

In addition, the disclosed method can protect the LED lighting device from being damaged by electrostatic discharge (ESD), or from being damaged due to static electricity from human body—especially when the lamp device is being installed or being uninstalled (or taken down). As such, the LED lighting devices can be effectively protected in both the production process and the installation process to avoid unnecessary losses.

The anti-breakdown protection method for the LED light sources can use a conductive element, e.g., a conductive circuit, to connect a positive electrode or a negative electrode of the LED light sources with the metallic heat-dissipation lamp cup to form the bypass discharge path. During a high-voltage testing, the leakage current can be bypassed and discharged due to use of the conductive element.

FIG. 1 depicts an exemplary LED lighting device consistent with various disclosed embodiments. As shown in FIG. 1, the exemplary LED lighting device can include a lamp head 1, a plastic (or rubber) base 2, a power supply 3, a plastic (or rubber) base cap 4, a metallic heat-dissipation lamp cup 5, a cooling substrate 6, a PCB board 7, a conductive circuit 8, a plurality of LED light sources 9, and/or a plurality of screws 10.

The lamp head 1 can be used to electrically and/or mechanically connect the LED lighting device (e.g., at one end of the lamp head 1) with other suitable components (e.g., external components or circuits) for use of the LED lighting device. The lamp head 1 can also function as, e.g., a lamp holder at the bottom of the LED lighting device. The plastic (or rubber) base 2 can be configured at the other end of the lamp head 1, e.g., on top of the lamp head 1. The power supply 3 can be configured within the plastic (or rubber) base 2. The plastic (or rubber) base cap 4 can be configured on top of the plastic (or rubber) base 2 capable of closing the plastic (or rubber) base 2 when needed.

The metallic heat-dissipation (or cooling) lamp cup 5 can be configured on the plastic base 2 to cover the plastic base 2. The metallic heat-dissipation lamp cup 5 can be mechanically connected to the plastic base 2 by a fixing element, e.g., a wedge-like mechanism, at the bottom of the metallic heat-dissipation lamp cup 5.

The metallic heat-dissipation lamp cup 5 can be configured having a hollow structure, e.g., in a form of a cylinder having various cross-sectional shapes including, for example, a circle, a rectangle, a square, and/or a triangle. For example, the metallic heat-dissipation lamp cup 5 can be a cylinder having one or more cross-sectional shapes combined together including, e.g., a cup, a lantern, or any suitable hollow structures.

The metallic heat-dissipation lamp cup 5 can include a plurality of outer cooling plates longitudinally configured and circumferentially distributed on the outer periphery of the metallic heat-dissipation lamp cup 5. The plurality of outer cooling plates can have a shape comply with the outer shape of the metallic heat-dissipation lamp cup 5. Each outer cooling plate can have a varied width along a circumferential direction of the metallic heat-dissipation lamp cup 5. In one embodiment, the plurality of cooling plates can be configured accordion-like.

The cooling substrate 6 can be configured on the metallic heat-dissipation lamp cup 5. In one embodiment, the cooling substrate 6 can have a peripheral region configured within a top peripheral region of the metallic heat-dissipation lamp cup 5. The cooling substrate 6 can include, for example, inner cooling plates configured within the hollow structure of the metallic heat-dissipation lamp cup 5 to facilitate heat dissipation of the LED lighting device.

The PCB board 7 can be configured over the cooling substrate 6. The PCB circuit board 7 can include a layered structure having a copper foil circuit layer (e.g., an upper layer) disposed on a dielectric layer, which is disposed on a thermally conductive layer. The power supply 3 can be connected to the two electrodes 11 on the copper foil circuit layer of the PCB board 7 by wiring.

The LED light sources 9 can be configured, e.g., soldered, on the copper foil circuit layer of the PCB board 7. The entire PCB board 7 can be mounted with the cooling substrate 6 by a number of screws, e.g., about four screws or any other suitable number of screws.

Figure 2:
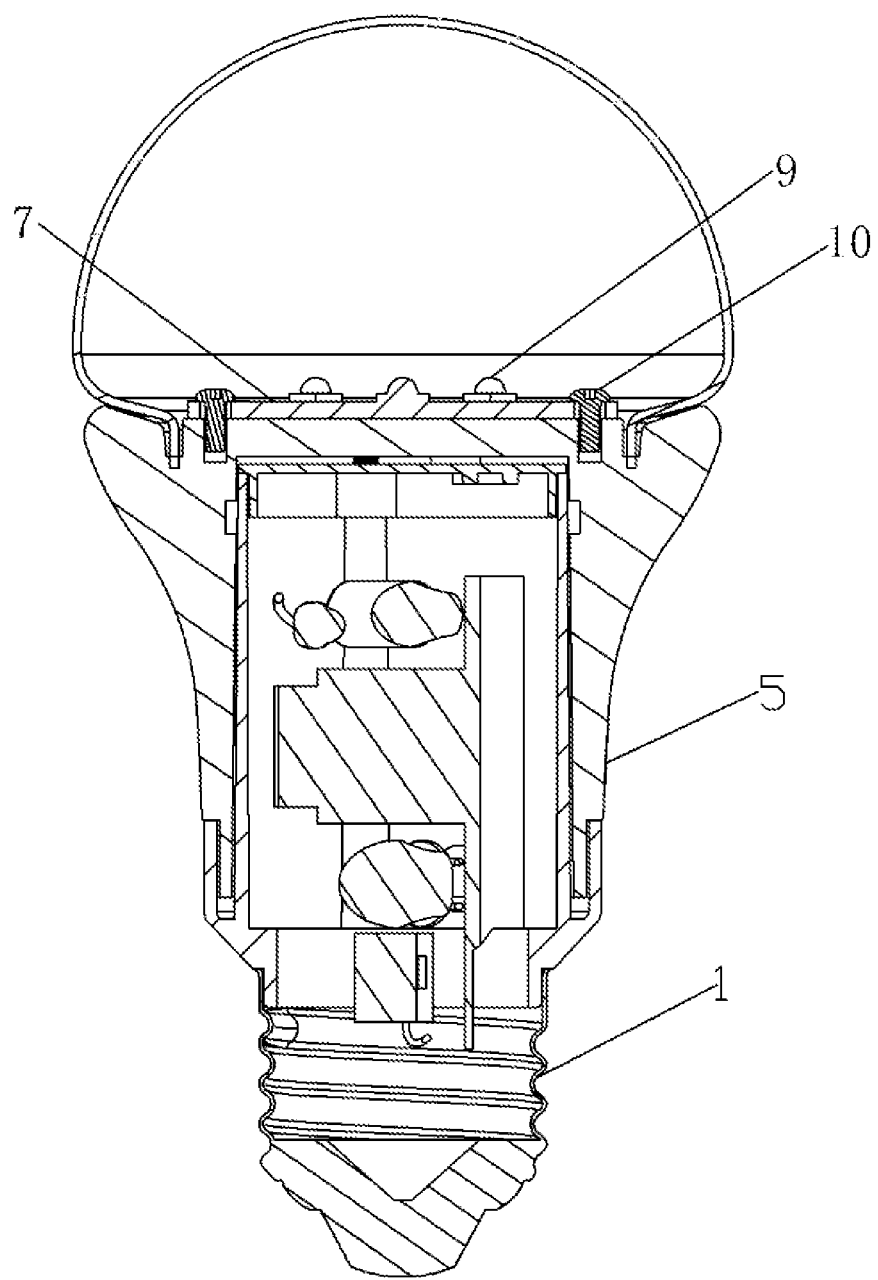
FIG. 2 depicts a cross sectional view of an exemplary LED lighting device consistent with various disclosed embodiments.
Figure 3:
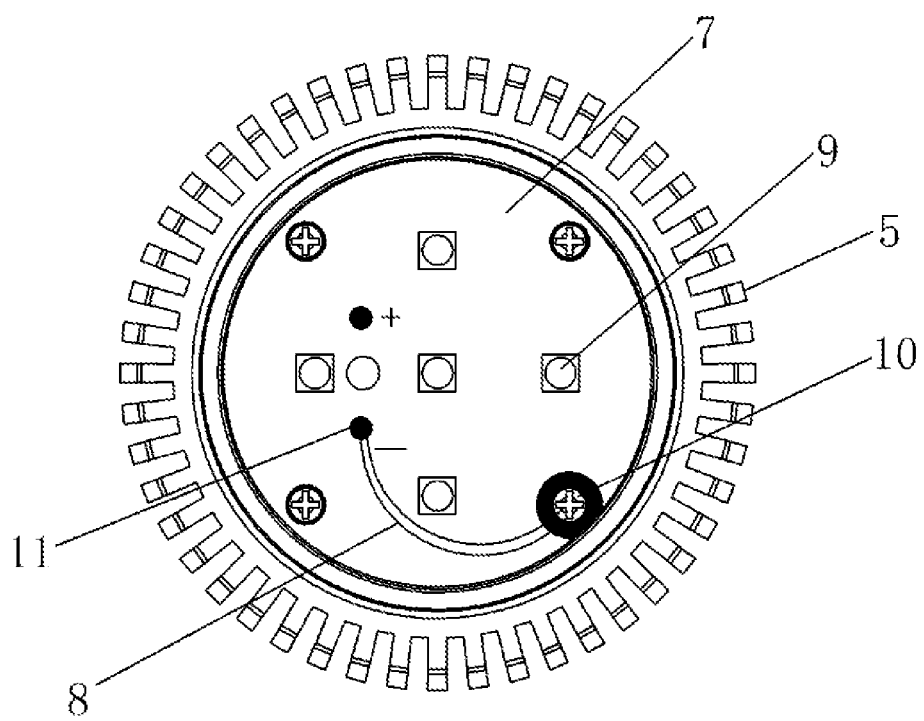
FIG. 3 is a schematic illustrating a connection between a PCB board and a screw in an exemplary LED lighting device consistent with various disclosed embodiments.

FIG. 2 depicts a cross sectional view of the exemplary LED lighting device shown in FIG. 1, and FIG. 3 is a schematic illustrating a connection between the PCB board and the screw in the exemplary LED device.

As shown in FIG. 3, a conductive circuit 8 may be printed between one electrode 11 on the copper foil circuit layer of the PCB circuit board 7 and a spot of the copper foil circuit layer of the PCB circuit board 7 that is in contact with a screw head of one screw 10.

As shown in FIGS. 2-3, when the screw 10 is screwed into the metallic heat-dissipation lamp cup 5, the screw head of the screw 10 can be electrically connected to the electrode 11 on the PCB board 7 through the conductive circuit 8. The electrode 11 may be a positive electrode or a negative electrode, although FIG. 3 shows a negative electrode is connected with the conductive circuit 8 for illustration purposes. A screw body of the screw 10 can be electrically connected to the metallic heat-dissipation lamp cup 5. The screw 10 can be used for mounting and fixing related components, and can also be used for discharging leakage current to protect the LED light sources 9.

Figure 4:
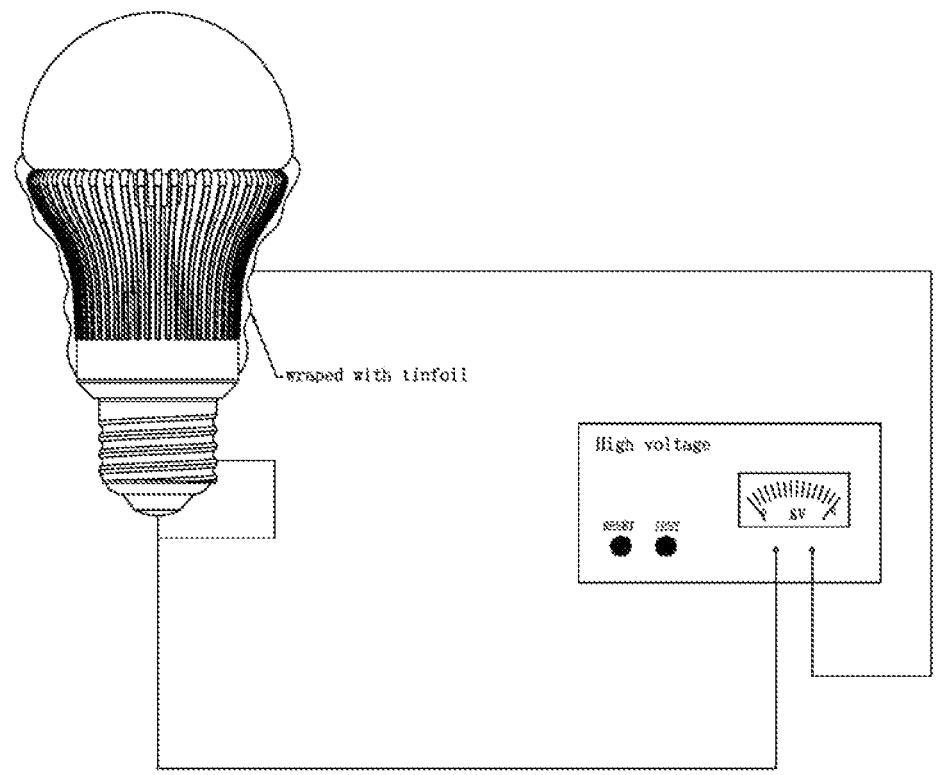
FIG. 4 is a diagram of an exemplary configuration of a high voltage test of an LED lighting device consistent with various disclosure embodiments.

FIG. 4 shows an exemplary configuration of a high voltage test of an LED lighting device. As shown in FIG. 4, one of the electrodes of the LED light sources can be electrically connected to the metallic heat-dissipation lamp cup in a manner to form a bypass discharge path to release leakage current to protect the LED light sources and thus to prevent breakdown of the LED light sources. Further, not only the LED lighting device can be effectively tested under high voltages, but also the LED light sources can be protected.

For example, as shown in FIGS. 1-4, a bypass discharge path between the LED light sources 9 and the metallic heat-dissipation lamp cup 5 can be formed by electrically connected components including the electrode 11 of the LED light sources 9, the conductive circuit 8, the screw 10, and the metallic heat-dissipation lamp cup 5.

In this manner, an LED lighting device and method for making the LED lighting device can be provided herein. For example, a power supply can be provided within the plastic base, and a metallic heat-dissipation lamp cup can be provided to cover the plastic base. A cooling substrate can be provided on the metallic heat-dissipation lamp cup. A printed circuit board (PCB) board can be configured over the cooling substrate. One or more LED light sources can be provided on the PCB board. The one or more LED light sources can have a positive electrode and a negative electrode that are provided on the PCB board and are connected to the power supply.

A plurality of screws can be used to attach the PCB board to the cooling substrate on the metallic heat-dissipation lamp cup. At least one screw of the plurality of screws can include a screw head electrically connected to one of the positive electrode and the negative electrode, and a screw body electrically connected to the metallic heat-dissipation lamp cup, such that the at least one screw provides a bypass discharge path between the one or more LED light sources and the metallic heat-dissipation lamp cup to release leakage current and to protect the one or more LED light sources. The bypass discharge path can discharge electric current or static electricity, thereby protecting the LED light source and preventing breakdown.

The embodiments disclosed herein are exemplary only. Other applications, advantages, alternations, modifications, or equivalents to the disclosed embodiments are obvious to those skilled in the art and are intended to be encompassed within the scope of the present disclosure.

INDUSTRIAL APPLICABILITY AND ADVANTAGEOUS EFFECTS

Without limiting the scope of any claim and/or the specification, examples of industrial applicability and certain advantageous effects of the disclosed embodiments are listed for illustrative purposes. Various alternations, modifications, or equivalents to the technical solutions of the disclosed embodiments can be obvious to those skilled in the art and can be included in this disclosure.

In certain embodiments consistent with the present disclosure, the LED lighting device may use a heat-dissipation component, such as a lamp cup or other components, to form a part of the device's leakage protection circuit. For example, in one embodiment, a heat sink component (e.g., a metal block) may be clipped on to an LED lighting device (or connected to the device using other retention methods such as using a retention bed) during the high voltage tests. The clipped on heat sink component (e.g., clipped on the metallic heat-dissipation lamp cup or any component(s) for a leakage protection circuit) may then act as a part of the leakage protection circuit during the tests by being electrically connected to the LED light sources. Such heat sink components (e.g., a metal block) may be used in the place of or in additional to the lamp cup or cooling substrate of the LED lighting device.

What is claimed is:

1. A method for making an LED lighting device comprising:
    providing a power supply within a plastic base;
    providing a metallic heat-dissipation lamp cup to cover the plastic base;
    providing a cooling substrate on top of the metallic heat-dissipation lamp cup;
    configuring a printed circuit board (PCB) over the cooling substrate;
    providing one or more LED light sources on the PCB board, wherein the one or more LED light sources include a positive electrode and a negative electrode that are provided on the PCB and are connected to the power supply; and
    using a plurality of screws to attach the PCB to the cooling substrate on top of the metallic heat-dissipation lamp cup, wherein at least one screw of the plurality of screws includes:
        a screw head electrically connected to one of the positive electrode and the negative electrode, and a screw body having a direct electrical connection to the metallic heat-dissipation lamp cup, such that the at least one screw provides a bypass discharge path between the one or more LED light sources and the metallic heat-dissipation lamp cup to release leakage current and to protect the one or more LED light sources; and
    printing a conductive circuit on the PCB to provide a direct electrical connection between the screw head and the one of the positive electrode and the negative electrode.

2. The method according to claim 1, wherein the metallic heat-dissipation lamp cup is mechanically attached to the plastic base by a fixing element at the bottom of the metallic heat-dissipation lamp cup.

3. The method according to claim 1, wherein the cooling substrate has a peripheral region configured within a top peripheral region of the metallic heat-dissipation lamp cup.

4. The method according to claim 1, wherein the PCB includes a layered structure having a copper foil circuit layer disposed on a dielectric layer that is disposed on a thermally conductive layer.

5. The method according to claim 4, wherein the one or more LED light sources are soldered on the copper foil circuit layer of the PCB.

6. The method according to claim 1, wherein the power supply is connected by wiring to the positive electrode and the negative electrode.

7. The method according to claim 1, wherein the PCB is entirely attached to the cooling substrate by about four screws.

8. The method according to claim 1, wherein the metallic heat-dissipation lamp cup includes a plurality of outer cooling plates longitudinally configured and circumferentially distributed on an outer periphery of the metallic heat-dissipation lamp cup.

9. An LED lighting device comprising:
a power supply configured within a plastic base;
a metallic heat-dissipation lamp cup configured to cover the plastic base;
a cooling substrate configured on the metallic heat-dissipation lamp cup;
a printed circuit board (PCB) configured over the cooling substrate;
one or more LED light sources configured on the PCB, wherein the one or more LED light sources have a positive electrode and a negative electrode that are on the PCB and are connected to the power supply; and
a plurality of screws configured to attach the PCB to the cooling substrate on the metallic heat-dissipation lamp cup, wherein at least one screw of the plurality of screws includes:
  a screw head electrically connected to one of the positive electrode and the negative electrode, and a screw body having a direct electrical connection to the metallic heat-dissipation lamp cup, such that the at least one screw provides a bypass discharge path between the one or more LED light sources and the metallic heat-dissipation lamp cup to release leakage current and to protect the one or more LED light sources, and
a conductive circuit printed on the PCB to provide a direct electrical connection between the screw head and the one of the positive electrode and the negative electrode.

10. The device according to claim 9, wherein the metallic heat-dissipation lamp cup is mechanically attached to the plastic base by a fixing element at the bottom of the metallic heat-dissipation lamp cup.

11. The device according to claim 9, wherein the cooling substrate has a peripheral region configured within a top peripheral region of the metallic heat-dissipation lamp cup.

12. The device according to claim 9, wherein the PCB includes a layered structure having a copper foil circuit layer disposed on a dielectric layer that is disposed on a thermally conductive layer.

13. The device according to claim 12, wherein the one or more LED light sources are soldered on the copper foil circuit layer of the PCB.

14. The device according to claim 9, wherein the power supply is connected to the positive electrode and the negative electrode by wiring.

15. The device according to claim 9, wherein the PCB is entirely attached to the cooling substrate by about four screws.

16. The device according to claim 9, wherein the metallic heat-dissipation lamp cup includes a plurality of outer cooling plates longitudinally configured and circumferentially distributed on an outer periphery of the metallic heat-dissipation lamp cup.

* * * * *